(12) United States Patent
Holmberg et al.

(10) Patent No.: US 9,525,347 B2
(45) Date of Patent: Dec. 20, 2016

(54) PROGRAMMABLE VOLTAGE CONVERTER

(71) Applicant: Telefonaktiebolaget L M Ericsson (publ), Stockholm (SE)

(72) Inventors: Torbjörn Holmberg, Kalmar (SE); Magnus Karlsson, Färgjestaden (SE); Jonas Malmberg, Färgjestaden (SE); Fredrik Wahledow, Färgjestaden (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 186 days.

(21) Appl. No.: 14/366,632

(22) PCT Filed: Jun. 12, 2013

(86) PCT No.: PCT/EP2013/062129
§ 371 (c)(1),
(2) Date: Jun. 18, 2014

(87) PCT Pub. No.: WO2014/198309
PCT Pub. Date: Dec. 18, 2014

(65) Prior Publication Data
US 2015/0340949 A1    Nov. 26, 2015

(51) Int. Cl.
*H02M 3/158* (2006.01)
*H02M 3/157* (2006.01)
*H02M 1/00* (2006.01)

(52) U.S. Cl.
CPC ............ *H02M 3/158* (2013.01); *H02M 3/157* (2013.01); *H02M 2001/0006* (2013.01); *H02M 2001/008* (2013.01)

(58) Field of Classification Search
CPC ............... H02M 2001/0006; H02M 2001/008; H02M 3/157; H02M 3/158
See application file for complete search history.

(56) References Cited

U.S. PATENT DOCUMENTS 5,786,992 A * 7/1998 Vinciarelli ............ H02J 1/102
                                                       363/131
2007/0290666 A1   12/2007 Hachiya
(Continued)

OTHER PUBLICATIONS

International Search Report and Written Opinion for PCT/EP2013/062129 mailed Feb. 12, 2014, 10 pages.

*Primary Examiner* — Jessica Han
*Assistant Examiner* — Bart Iliya
(74) *Attorney, Agent, or Firm* — Withrow & Terranova, PLLC

(57) ABSTRACT

A voltage converter (200) is disclosed, which comprises a controller (210) operable in: a first mode to control the voltage converter so as to convert an input voltage ($V_{in}$) at an input (230) of the voltage converter to an output voltage ($V_{out}$) at an output (240) of the voltage converter; and a second mode, in which the controller (210) is configurable by configuration control signals (270) so as to change the control applied by the controller to the voltage converter. The voltage converter (200) also includes a power module (280) arranged to derive and supply an operation voltage ($V_{operation}$) to the controller (210), the power module (280) being arranged to derive the operation voltage from the input voltage ($V_{in}$) during operation of the controller (210) in the first mode, and a voltage source (340) other than the input voltage ($V_{in}$) during operation of the controller (210) in the second mode. There is also described herein a power supply system comprising one or more such voltage converters, and a method of configuring the power supply system.

4 Claims, 8 Drawing Sheets

(56) References Cited

U.S. PATENT DOCUMENTS

| | | | |
|---|---|---|---|
| 2009/0296432 A1* | 12/2009 | Chapuis | H02J 1/08 |
| | | | 363/65 |
| 2010/0013307 A1* | 1/2010 | Heineman | G06F 1/26 |
| | | | 307/33 |
| 2011/0234000 A1* | 9/2011 | Yan | H02M 3/157 |
| | | | 307/31 |
| 2012/0297104 A1 | 11/2012 | Thottuvelil et al. | |
| 2012/0326691 A1* | 12/2012 | Kuan | H02M 3/158 |
| | | | 323/299 |
| 2013/0119962 A1 | 5/2013 | Holmberg et al. | |

* cited by examiner

PROGRAMMABLE VOLTAGE CONVERTER

This application is a 35 U.S.C. §371 national phase filing of International Application No. PCT/EP2013/062129, filed Jun. 12, 2013, the disclosure of which is incorporated herein by reference in its entirety.

TECHNICAL FIELD

The present invention relates to the field of voltage converters, and more particularly to a voltage converter having a configurable controller for controlling the operation of the voltage converter and a power module for powering the controller, as well to methods of configuring a system of configurable voltage converters.

BACKGROUND

A voltage converter can be used to supply power to various kinds of electrical devices, and operates by converting an input voltage received at its input terminal to an output voltage provided at an output terminal of the voltage converter. A voltage converter can take one of many different forms, which may be selected depending on the requirements of the application at hand. For example, the switched mode power supply (SMPS) is a well-known type of voltage converter that is well-suited to use in personal computers and portable electronic devices such as cell phones, for example, owing to its small size and weight, and high efficiency. A SMPS achieves these advantages by switching one or more switching elements such as power MOSFETs at a high frequency (usually tens to hundreds of kHz), with the frequency or duty cycle of the switching being adjusted using a feedback signal to convert an input voltage to a desired output voltage. A voltage converter may take the form of a rectifier (AC/DC converter), a DC/DC converter, a frequency changer (AC/AC) or an inverter (DC/AC), for example.

However, there are applications whose requirements cannot be met by a single voltage converter. For example, the demand for ever faster and more complex signal and data processing has fuelled the need for new generations of signal processing systems having multiple high-performance processors, which are characterised by their need for multiple low supply voltages, high levels of current demand and tight supply voltage regulation requirements. These needs are met by power supply systems such as the Intermediate Bus Architecture (IBA) power supply system, which employ a multi-stage voltage conversion arrangement having multiple voltage converters to provide a number of tightly-regulated voltages from an input power source.

FIG. 1 shows a schematic of a conventional IBA power supply system. The power supply system 100 shown in FIG. 1 is an example of a three-stage power distribution network, wherein from a primary power source is fed to the respective inputs of one or more first-stage voltage converters. More specifically, power from mains voltage sources "Mains A" and "Mains B" is fed to the inputs of each of two first-stage voltage converters, each provided in the form of a Power Input Module (PIM), 110-1 and 110-2. The power output terminals of PIMS 110-1 and 110-2 are both connected via a power bus 120 to the respective inputs of a plurality of second-stage voltage converters. By way of example, two such second-stage voltage converters are shown in FIG. 1, namely DC/DC converters 130-1 and 130-2. The outputs of the DC/DC converters 130-1 and 130-2 are connected via the Intermediate Voltage Bus (IVB) 140 to a plurality of Point-of-Load (POL) regulators, 150-1 to 150-3, each of which delivers a regulated voltage to the load 170. For simplicity, isolation barriers, Bus drivers, Bus isolators and signal filters are not shown in FIG. 1.

Each of the PIMs 110-1 and 110-2, DC/DC converters 130-1 and 130-2, and POL regulators 150-1 to 150-3 shown in FIG. 1 comprises a digitally manageable on-board controller that controls one or more aspects of the respective voltage converter's operation, such as the voltage conversion ratio, start-up procedure and current sharing operation, as well as functions such as over-voltage/over-current protection. The control performed by each controller can be configured by configuration control signals communication to the controller using e.g. the Power Management Bus (PMBus) protocol, via any suitable communication link. PMBus is an open-standard digital power management protocol with a fully defined command language. For example, there are commands for controlling, configuring and monitoring a converter's operating parameters, such as its output voltage, warning and fault thresholds for input or output voltages and currents, temperature etc.

In the present context, the term "configuring" may refer to the process of programming or reprogramming the controller to implement a procedure that may form at least a part of a computer program, module, object or sequence of instructions executable thereby. Configuration may also refer to the process of setting (e.g. by initializing or updating) one or more parameters used by said procedure to control an aspect of the voltage converter's operation. The "configuring" of a voltage converter as used herein should also be understood to refer to the process of re-configuring the voltage converter.

The configuration control signals may, as in the present example, be transmitted to the controller by a Board Power Manager (BPM) 160, which performs functions including system control and monitoring, fault detection etc. In addition to the configuration control signals, the BPM 160 may also transmit signals to enable the PIMs 110-1 and 110-2 to perform voltage conversion so as to apply the voltages generated thereby to the power bus 120.

Each voltage converter includes a power module that generates an operation voltage to power its controller during operation, so that the controller can be configured by configuration control signals and operate to control the voltage converter. The power module generates the operation voltage by converting the voltage provided at the input of the voltage converter to an appropriate level for the controller's logic circuit. In other words, in a conventional programmable voltage converter, power for the controller thereof is derived from the voltage applied to the voltage converter's input terminal during operation. The BPM 160, on the other hand, receives the power required for its operation from a power source external to the BPM 160, typically an auxiliary power converter provided elsewhere in the power supply system 100 (e.g. inside one of the PIMs 110-1 and 110-2), or from the production test system.

SUMMARY

As the number of power supply devices in board power systems increases along with the demand for a higher level of reuse, flexibility and configurability, the need for "high performance" configuration solutions has increased. In this context, the term "high performance" can mean different things to different users. It may, for example, refer to the capability to cope with late changes in the design phase that are to be incorporated into board prototype/pilot production runs. The term "high performance" may alternatively refer to the achievement of a high level of supervision and control of volume production of expensive and/or high volume boards in manufacturing, or a high level or supervision and control at power-up of board in its target environment.

The present inventors have recognised that the conventional configuration of the power modules that are provided in the voltage converters of power supply systems of various kinds presents an obstacle to the achievement of higher performance configuration of those converters. More specifically, a conventional power module that supplies an operation voltage to the controller of a programmable voltage converter derives the required operation voltage from the voltage appearing at the converter's input during operation, usually by stepping down the input voltage to an appropriate level for the controller's circuitry, using a simple SMPS, for example. As the design of the power module is normally subject to the constraint that the input voltage of the voltage converter must be within a predetermined range during operation (in accordance with the converter's design specification), the power module can supply the controller with the required operation voltage, and thus allow the controller to be configured and otherwise operate, only when the converter's input voltage lies within the predetermined range of values. This, however, can make in situ configuration of the controller a difficult and time-consuming task. For example, when the voltage converter is in situ, forming part of a power supply system as shown in FIG. 1, e.g. one of POL regulators 150-1 to 150-3, the PIMs 110-1 and 110-2 and DC/DC converters 130-1 and 130-2 upstream of the POL regulator must be configured beforehand and operated to generate an input voltage for the POL regulator that is in accordance with the POL regulator's specified input voltage range; only once this has been done can the POL regulator's controller be configured with configuration control signals from the BPM 160.

Furthermore, even once the circuit components upstream of the voltage converter have been configured to supply the required voltage to the input terminal of the voltage converter, the ensuing supply of power by the voltage converter to its downstream components (which occurs once power is supplied to the converter's input but before the converter's controller has been configured to generate an appropriate output voltage) risks damaging those downstream components. It should be noted that these problems are not limited to voltage converters of a system of cascaded converters as shown in FIG. 1 but may arise in many other applications of voltage converters that have a conventionally configured power module as described above.

The present inventors have realised that at least some of the short-comings of conventional voltage converters can be overcome by providing the voltage converter with a power module that is arranged to derive the operation voltage from a voltage source other than the input voltage so as to power the controller while it is being configured by received configuration control signals. In this way, the constraints on the voltage level, which heretofore needed to be supplied (via the input power rail) to the converter in order to allow the converter's controller to be configured, are lifted. In addition, as the operation voltage is not derived from the converter's input power rail during configuration of the converter but from another voltage source, it is possible to avoid the risk of the converter damaging any downstream components with an excessively high output voltage before the controller configuration process has been completed. This allows the voltage converter to be configured safely even once it has been installed in a power supply system.

The power module may be arranged to derive the operation voltage from a voltage source that provides a voltage lower than the lowest input voltage that can be converted by the voltage converter during operation. In some embodiments, the power module may receive the operation voltage from the voltage source and relay the received operation voltage to the controller during its configuration, i.e. without performing any voltage conversion on the received voltage.

More specifically, the inventors have devised a voltage converter comprising a controller that is operable in: (i) a first mode to control the voltage converter so as to convert an input voltage at an input of the voltage converter to an output voltage at an output of the voltage converter; and (ii) a second mode, in which the controller is configurable by configuration control signals so as to change the control applied by the controller to the voltage converter. The voltage converter further comprises a power module arranged to derive and supply an operation voltage to the controller, the power module being arranged to derive the operation voltage from the input voltage during operation of the controller in the first mode, and a voltage source other than the input voltage during operation of the controller in the second mode.

The inventors have further devised a power supply system, comprising at least one voltage converter as set out above and a power system controller configured to generate the configuration control signals and transmit the configuration control signals to the at least one voltage converter via a communication link.

The inventors have further devised a method of controlling a voltage converter as set out above, comprising configuring the controller by generating control signals to cause the controller to be supplied with an operation voltage that is derived from a voltage source other than the input voltage during operation in the second mode, such that the controller can be configured by received configuration control signals, and transmitting the configuration control signals to the controller so as to change the control applied by the controller to the voltage converter. Following configuration of the controller, control signals are generated to cause the controller to be supplied with an operation voltage derived from the input voltage so that the controller can control the voltage converter during operation in the first mode.

The inventors have further devised a method of controlling a power supply system comprising a first voltage converter having: a controller operable in a first mode to control the first voltage converter so as to convert an input voltage of the first voltage converter to an output voltage and output the output voltage to an intermediate voltage bus, and in a second mode, in which the controller is configurable by configuration control signals so as to change the control applied by the controller to the first voltage converter; and a power module arranged to derive and supply an operation voltage to the controller, the power module being arranged to derive the operation voltage from the input voltage during operation of the controller in the first mode, and a voltage on the intermediate voltage bus during operation of the controller in the second mode. The power supply system further comprises a second voltage converter connected to the intermediate voltage bus and arranged to convert the voltage on the intermediate voltage bus to a second output voltage, and a switch connected to the intermediate voltage bus and operable to apply a voltage to the intermediate voltage bus that is derived from a voltage source other than the input voltage of the first voltage converter. The method comprising configuring the controller of the first voltage converter by: controlling the switch to connect the voltage source to the intermediate voltage bus such that the power module derives the operation voltage from the intermediate voltage bus to power the controller of the first voltage converter; transmitting configuration control signals to the controller so as to change the control applied by the controller to the first voltage converter; and controlling the switch to disconnect the voltage source from the intermediate voltage bus. Following configuration of the controller, control signals are generated to cause the controller to be supplied with an operation voltage derived from the input voltage of the first voltage converter so that the controller can control the first voltage converter during operation in the first mode.

The inventors have further devised a non-transitory storage medium or a signal carrying computer-readable computer program instructions, which, if executed by a processor, cause the processor to perform at least one of the methods set out above.

BRIEF DESCRIPTION OF THE DRAWINGS

Embodiments of the invention will now be explained in detail, by way of example only, with reference to the accompanying figures, in which.

DETAILED DESCRIPTION OF EMBODIMENTS

First Embodiment

Figure 2:
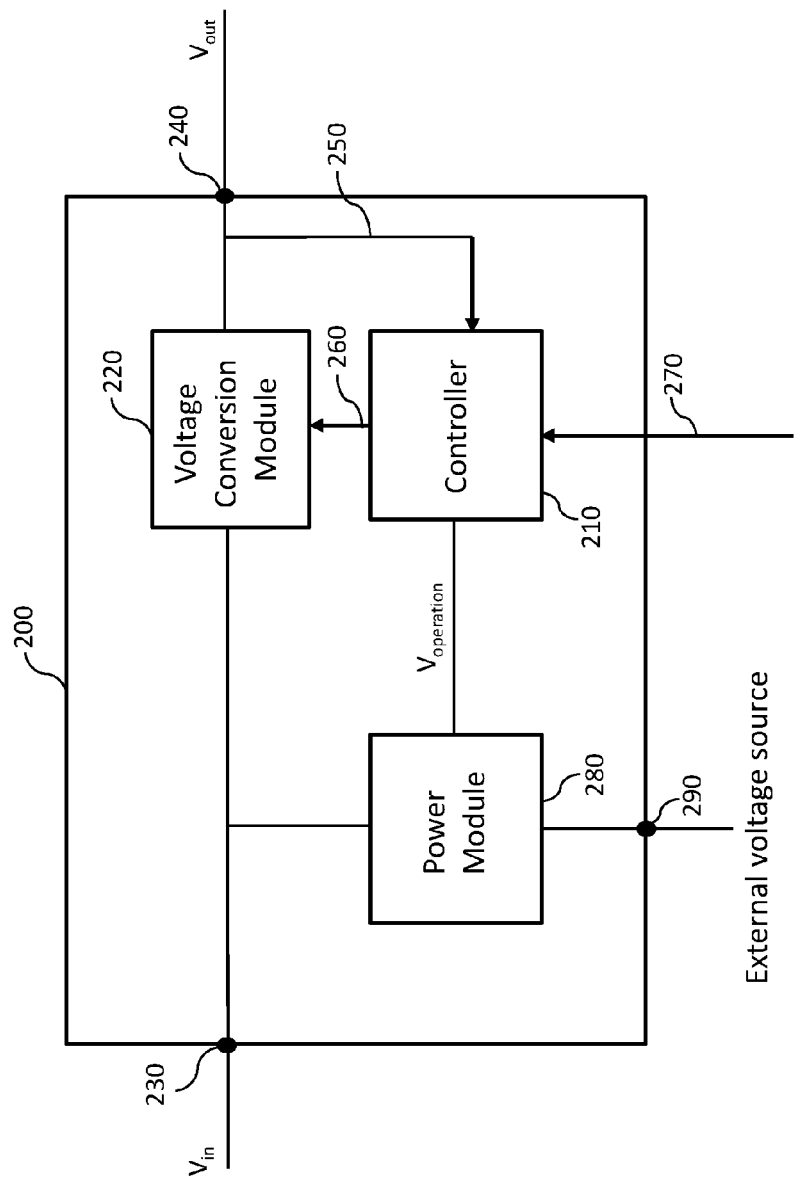
FIG. 2 is a schematic of a voltage converter according to a first embodiment of the present invention.

FIG. 2 shows a schematic of a voltage converter 200 according to a first embodiment of the present invention. The voltage converter 200 comprises a controller 210 configured to control the voltage converter so as to convert, using a voltage conversion module 220, an input voltage $V_{in}$ at an input terminal 230 of the voltage converter 200 to an output voltage $V_{out}$ at an output terminal 240 of the voltage converter.

In the present embodiment, the voltage converter 200 is provided in the exemplary form of an SMPS, which converts the input voltage $V_{in}$ to the output voltage $V_{out}$ by switching at least one switching element (such as a power MOSFET), which forms part of the voltage conversion module 220, with a duty cycle determined by a controller that is provided in the form of a Pulse Width Modulator (PWM). The voltage conversion module 220 may comprise further components (such as an isolation transformer, and a rectifying network, choke, output capacitor etc. on the secondary side of the transformer), depending on the selected converter topology.

The need for, and configuration of, such further power train components in various converter topologies will be familiar to those skilled in the art, such that further explanation thereof is unnecessary here.

In general, the voltage converter 200 may be regulated or unregulated. In the present embodiment, the voltage converter 200 is output voltage-regulated and includes a feedback loop 250 for feeding back to the controller 210 a signal indicative of the converter's output voltage $V_{out}$, so that the controller 210 can adjust the duty cycle (or, in the case of a frequency-controlled SMPS, the frequency) with which the switching element(s) is/are switched in order to minimise any deviation from a target output voltage value.

The controller 210 of the voltage converter 200 is operable in two modes, as follows.

In the first mode of operation, the controller 210 controls an aspect of the voltage converter's operation. For example, in the present embodiment, the controller 210 controls the voltage conversion module 220 so as to perform its core function of converting the input voltage $V_{in}$ to a predetermined output voltage, specifically by generating switch control signals 260 to control the switching element(s) in the voltage conversion module 220 to switch with a duty cycle that is required to achieve the target output voltage. The controller 210 may additionally or alternatively control other aspects of the voltage converter's operation, for example one or more protective functions (e.g. over-heating and/or over-voltage/over-current protection), operation of the voltage converter during start-up or when used in a current-sharing configuration with one or more other voltage converters.

When operating in the second mode of operation, the controller 210 is configurable by received configuration control signals 270 to change the control it applies to the voltage converter 200. In the present embodiment, the controller 210 may be configured by the received configuration control signals to change the target output voltage value used in voltage regulation, and may further be configurable by the configuration control signals to modify its control of the other aspects of the converter's operation set out above, e.g. the voltage/current threshold values used in the over-voltage/over-current protection scheme, switching timings used during the start-up sequence, and so on.

To enable the controller 210 to operate in either of the two operational modes set out above, it needs to be supplied with an operation voltage, $V_{operation}$, to power its circuitry, which includes a CPU, memory storing software that defines the control to be applied by the controller 210, a communication module for receiving configuration control signals and transmitting monitored operational parameters, fault reporting etc., and an internal communications bus that allows the controller's components to communicate with one another.

As shown in FIG. 2, the voltage converter 200 comprises a power module 280 arranged to supply the operation voltage, $V_{operation}$, to the controller 210. The power module 280 is arranged to derive the operation voltage from the input voltage $V_{in}$ during operation of the voltage converter 200 in the first mode, specifically by stepping down the (relatively high) input voltage $V_{in}$ to a lower level that is suitable for the circuitry of the controller 210 (typically 3.3 V). The power module 280 may, as in the present embodiment, be provided in the form of a simple output voltage-regulated SMPS located inside the voltage converter 200. Alternatively, the power module may be provided in the form of a low voltage dropout regulator to convert the input voltage $V_{in}$ to the operation voltage.

During operation of the voltage converter 200 in the second mode, the power module 280 derives the operation voltage from a voltage source other than the input voltage $V_{in}$. In other words, in the second mode of operation, the power module 280 derives the operation voltage, $V_{operation}$, from a voltage source other than a voltage source that directly supplies the input voltage $V_{in}$ to an input voltage terminal of the voltage converter 200 so as to be converted to the output voltage $V_{out}$ by the voltage converter 200 during operation. The power module 280 may, as in the present embodiment, convert to $V_{operation}$ a voltage that is supplied by the external voltage source to a supply terminal 290 of the voltage converter (which is different from the input terminal 230 and the output terminal 240). Alternatively, the external voltage source may be arranged to generate the operation voltage itself, such that the power module 280 is not required to convert the voltage at the supply terminal 290 from the external voltage source but simply to convey it to the controller 210 unchanged. The voltage source may be provided in any suitable or desirable form, for example as a voltage generator that forms part of a production or test system that may be used to configure the controller.

Second Embodiment

Figure 3:
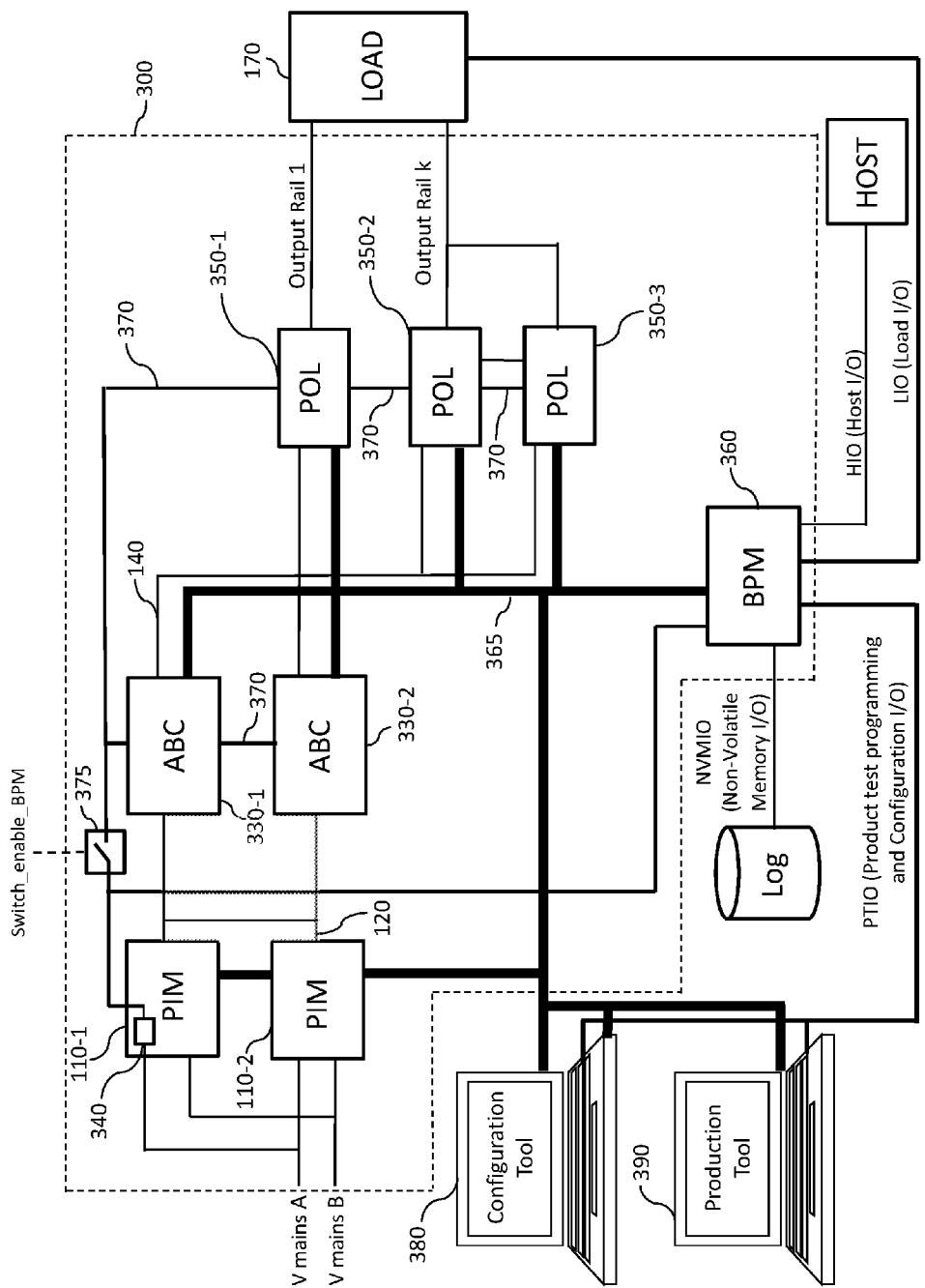
FIG. 3 is a schematic of a power supply system according to a second embodiment of the invention, which comprises voltage converters of the first embodiment.

FIG. 3 shows a power supply system 300 according to a second embodiment of the present invention.

Figure 1:
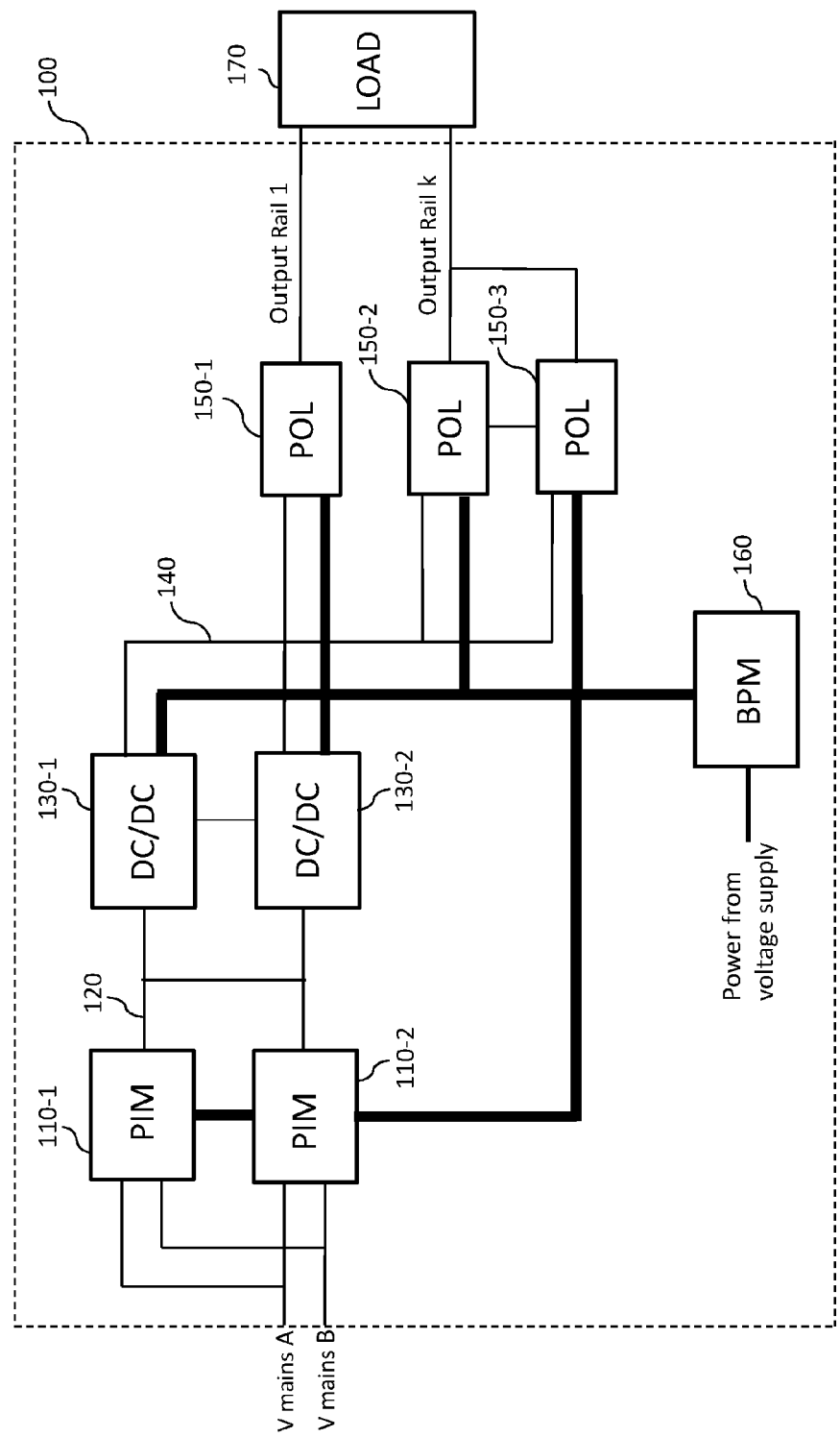
FIG. 1 illustrates a conventional power supply system.

The power supply system 300 shown in FIG. 3 is an example of a multi-stage power distribution system, wherein power from a primary power source is fed to the respective inputs of one or more first-stage voltage converters. More specifically, power from mains voltage sources "Mains A" and "Mains B" is fed to the inputs of each of a plurality of first-stage voltage converters which, in the present embodiment, are provided in the exemplary form of PIMs, 110-1 and 110-2, as described above with reference to FIG. 1. In the present embodiment, the PIMs 110-1 and 110-2 also perform OR-ing between the mains supplies "Mains A" and "Mains B" and, in addition, provide filtering and hold-up capacity. The power output terminals of PIMS 110-1 and 110-2 are both connected via a power bus 120 to the respective inputs of a plurality of second-stage voltage converters. By way of example, two such second-stage voltage converters are shown in FIG. 1, namely DC/DC converters 330-1 and 330-2. The outputs of the DC/DC converters 330-1 and 330-2 are connected via the IVB 140 to a plurality of POL regulators, each of which delivers a regulated voltage to the load 170. The power supply system 300 of FIG. 3 has three such POL regulators, 350-1 to 350-3. For simplicity, isolation barriers, Bus drivers, Bus isolators and signal filters are not shown in FIG. 3.

In the present embodiment, each of the DC/DC converters 330-1, 330-2 and the POL regulators 350-1 to 350-3 is provided in the form of a converter according to the above-described first embodiment, and are thus configurable by received configuration control signals when operating in the second operation mode described above. However, more generally, the power supply system of an embodiment comprises at least one such voltage converter.

The configuration control signals are transmitted to the respective controllers 210 of the voltage converters 330-1, 330-2 and 350-1 to 350-3 by a power system controller, which may, as in the present embodiment, be provided in the form of a BPM 360. The configuration control signals are transmitted from the BPM 360 to the voltage converters via a communications link 365 in accordance with the PMBus protocol (although other protocols may alternatively be used).

Figure 4:
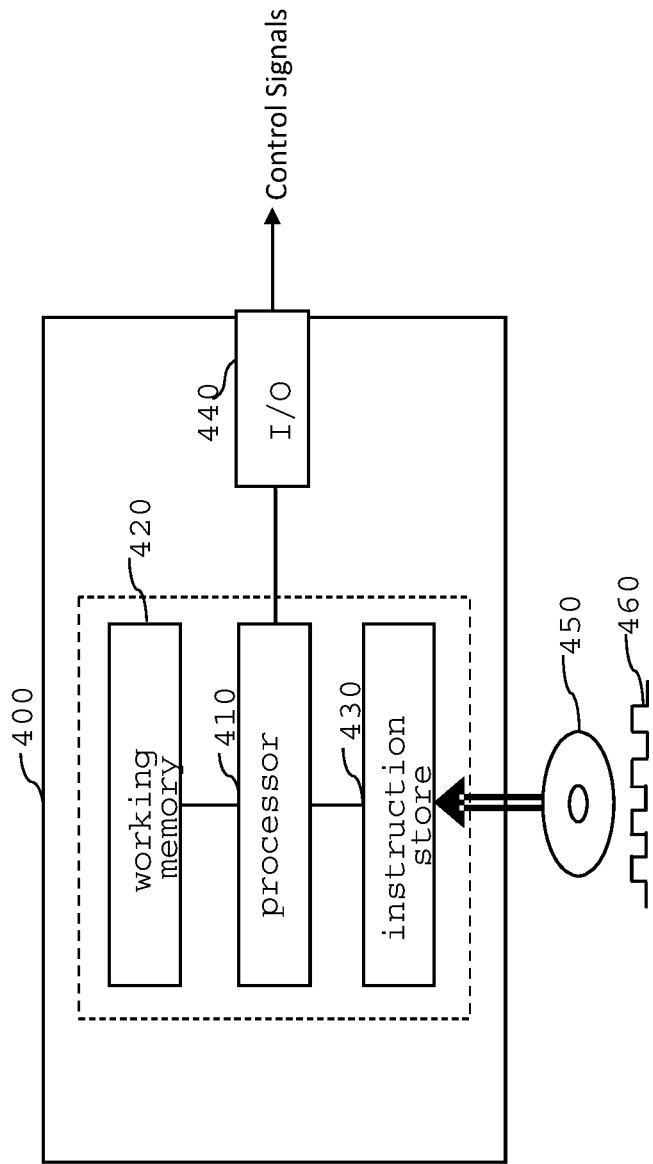
FIG. 4 is a schematic showing components of a programmable signal processing apparatus which implements the Board Power Manager (BPM) shown in FIG. 3.

The BPM 360 may, as in the present embodiment, be implemented in a programmable signal processing apparatus, for example as shown in FIG. 4. The programmable signal processing apparatus 400 shown in FIG. 4 comprises a processor 410, a working memory 420 and an instruction store 430 storing computer-readable instructions which, when executed by the processor 410, cause the processor 410 to perform the processing operations hereinafter described to generate control signals for configuring the controllers of the voltage converters 330-1, 330-2 and 350-1 to 350-3. The programmable signal processing apparatus 400 also includes an input/output (I/O) module 440 which operates to transmit the generated configuration control signals to the voltage converters 330-1, 330-2 and 350-1 to 350-3 via any suitable communications link 365. The instruction store 430 may comprise a ROM which is pre-loaded with the computer-readable instructions. Alternatively, the instruction store 430 may comprise a RAM or similar type of memory, and the computer-readable instructions can be input thereto from a computer program product, such as a non-transitory computer-readable storage medium 450 such as a CD-ROM, etc. or a computer-readable signal 460 carrying the computer-readable instructions.

Referring again to FIG. 3, in addition to the BPM 360 or as an alternative thereto, the digitally manageable voltage converters 330-1, 330-2 and 350-1 to 350-3 may be configurable a power system controller in the alternative form of a system tool that is implemented on suitable computer hardware (e.g. a desktop PC or laptop), namely a Configuration Tool 380 during a system design phase, or a Production Tool 390 for production programming, configuration and testing. It should also be noted that the BPM 360 may be provided as part of any of the voltage converters 110-1, 110-2, 330-1, 330-2 and 350-1 to 350-3, or alternatively as a stand-alone (separate) component in the power supply system 300.

The power supply system 300 comprises a voltage source that supplies the BPM 360 with the power required for its operation. By way of example, this voltage source is provided in the form of an auxiliary voltage converter 340 in the present embodiment, which forms part of the PIM 110-1. The auxiliary voltage converter 340 generates the voltage to be applied to the BPM 360 (hereafter referred to as the "management voltage") by converting the input voltage to the PIM 110-1, and supplies the management voltage to the BPM 360 via a power management bus 370. The BPM 360 may, however, alternatively receive the management voltage from a voltage source external to the power supply system 300, such as a production test system being used to assess the performance of the power supply system 300. The voltage source may provide an adjustable management voltage that may be increased or decreased as required by the user, in order to compensate for the voltage drop over any other component(s) (not shown in FIG. 3) that may connect the voltage source 340 to the power modules 280 of the voltage converters 330-1, 330-2 and 350-1 to 350-3.

The BPM 360 functions to co-ordinate and control the operations of the controllers 210 of the voltage converters 330-1, 330-2 and 350-1 to 350-3. For example, when a voltage converter is acting in the first mode of operation, the BPM 360 performs functions such as monitoring the voltage converter's output voltage, or detecting the occurrence of any fault in the voltage converter. When a voltage converter operates in the second mode of operation, the BPM 360 is configured to generate configuration control signals and transmit the configuration control signals to the voltage converter via the communication link 365.

To make the power supply system 300 more compact, economical to manufacture and easier to maintain, the auxiliary voltage converter 340 is preferably connected not only to the BPM 360 but also to the voltage converters 330-1, 330-2 and 350-1 to 350-3 during their configuration, such that the power modules of the converters can derive the operation voltage from the management voltage during operation in the second mode. Thus, the auxiliary voltage converter 340 is preferably arranged to serve the dual purpose of powering both the BPM 360 and the controllers of the voltage converters 330-1, 330-2 and 350-1 to 350-3 during their operation in the second mode. The supply of the management voltage from the auxiliary voltage converter 340 to the voltage converters 330-1, 330-2 and 350-1 to 350-3 is controlled by the BPM 360, specifically via a switch 375 that is controllable by the BPM 360.

The BPM 360 is arranged to configure at least some of the voltage converters 330-1, 330-2 and 350-1 to 350-3 during their operation in the second mode, by performing a series of operations that will now be explained with reference to FIG. 5. Although these operations are described, by way of example, with reference to the POL regulator 350-1, it will be appreciated that the BPM 360 may similarly configure any of the remaining configurable voltage converters in the system. Furthermore, these voltage converters may thus be configured by the BPM 360 sequentially or in parallel.

Figure 5:
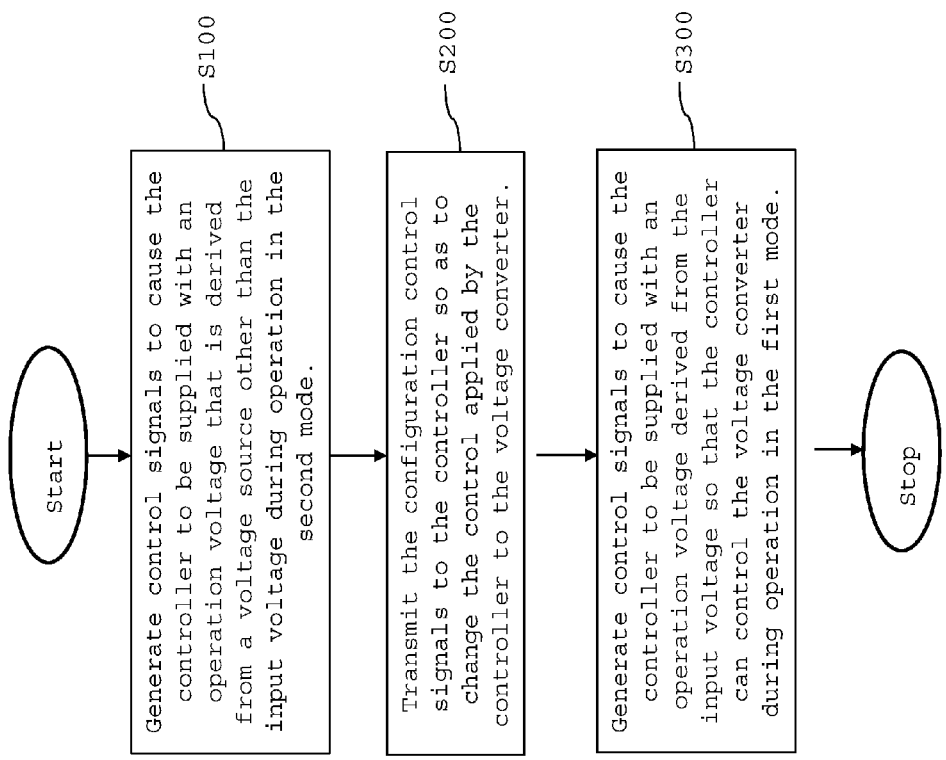
FIG. 5 is a flow diagram illustrating operations performed by the BPM of FIG. 3 to configure the voltage converters in the power supply system of FIG. 3.

In step S100 of FIG. 5, the BPM 360 generates control signals to cause the controller of the POL regulator 350-1 to be supplied with an operation voltage that is derived from a voltage source other than the input voltage of the POL regulator 350-1 during operation in the second mode. More specifically, the BPM 360 generates a control signal to close the switch 375 such that the POL regulator 350-1 is supplied with the management voltage generated by the auxiliary voltage converter 340. The power module of the POL regulator derives the operation voltage, $V_{operation}$, by converting the management voltage to the appropriate level for the POL regulator's controller.

Then, in step S200, the BPM 360 generates and transmits configuration control signals to the controller of the POL regulator 350-1 via the communications link 365 so as to change one or more aspects of the control applied by this controller, as explained above.

In step S300, the BPM 360 generates control signals to cause the controller of the POL regulator 350-1 to be supplied with an operation voltage derived from the input voltage of the POL regulator 350-1 so that the controller can control the POL regulator 350-1 during operation in the first mode. In particular, the BPM 360 generates a control signal to open switch 375 such that the POL regulator 350-1 is no longer supplied with the management voltage generated by the auxiliary voltage converter 340. The power module of the POL regulator 350-1 is thus placed in a state in which it can derive the operation voltage from the input voltage of the POL regulator 350-1 when the DC/DC converters 330-1 and 330-2 supply a voltage to the IVB 140 during subsequent operation.

Third Embodiment

Figure 6:
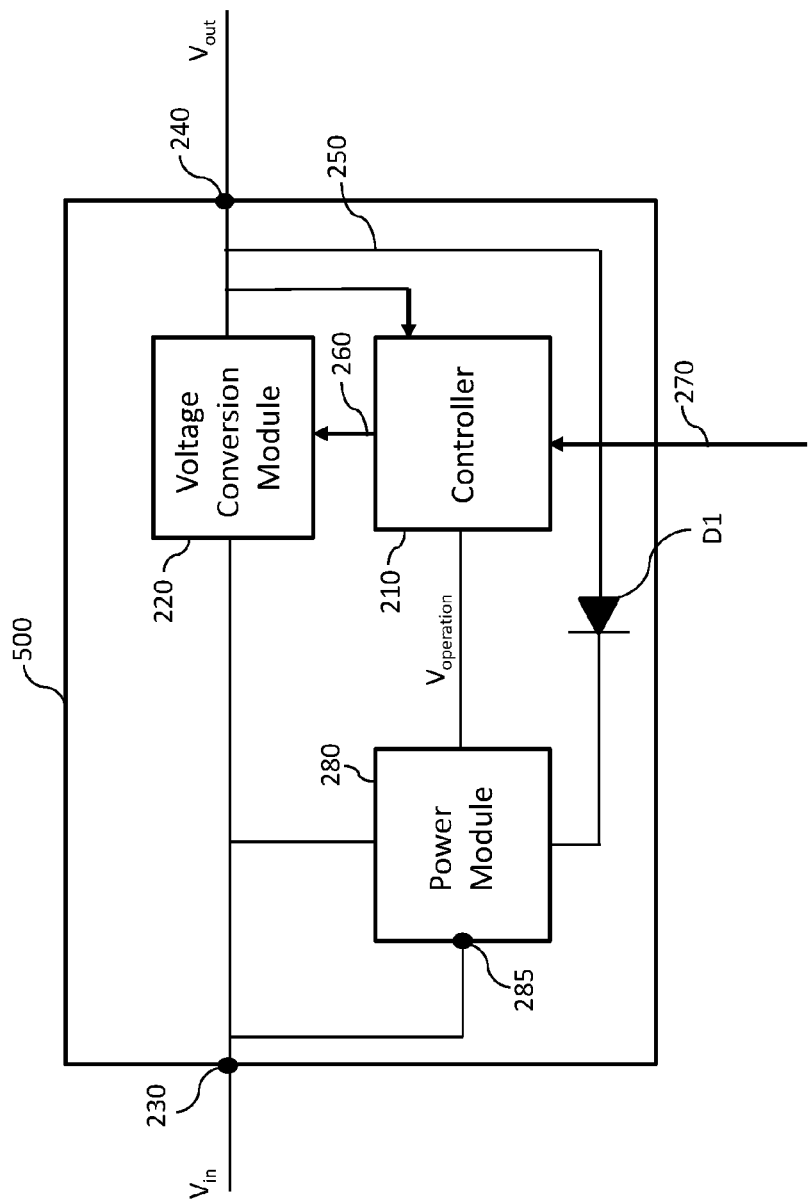
FIG. 6 is a schematic of a voltage converter according to a third embodiment of the present invention.

FIG. 6 shows a voltage converter 500 according to a third embodiment of the present invention. The voltage converter 500 of the present embodiment comprises a controller 210, voltage conversion module 220, and a power module 280 that are the same as in the above-described first embodiment. The description of these components will therefore not be repeated.

However, in the present embodiment, the voltage converter 500 is arranged to derive the operation voltage specifically from a voltage provided at the output terminal 240 of the voltage converter 500 during operation of the controller 210 in the above-described second mode. This arrangement obviates the need to provide the voltage converter with a dedicated terminal (290 in FIG. 2) for receiving an externally supplied voltage from which the operation voltage for the controller 210 is to be derived, thereby simplifying the construction of the voltage converter. Furthermore, this arrangement also makes it possible to use the voltage converter as an Intermediate Bus Converter (IBC) in an IBA power supply system, which IBC is capable of being configured safely (i.e. without risk of damage to itself or other components of the power supply system), and without any extra power routing to the IBC being required, as will be explained in the following fourth embodiment.

The power module 280 of the voltage converter 500 receives a voltage provided at the output terminal 240 of the converter (by a voltage source other than the voltage conversion module 220) during the second mode of operation. The power module 280 is arranged to apply the voltage provided at the output terminal 240 (selected so as to be at the level $V_{operation}$ suitable for powering the circuitry of the controller 210) such that the circuitry of the controller 210 may be configurable by configuration control signals 270. However, during operation in the first mode, the power module 280 converts the input voltage $V_{in}$, by a suitably configured step-down converter (not shown), to the operation voltage, $V_{operation}$.

The voltage converter 500 may, as in the present embodiment, further comprise a rectifying element (e.g. a diode) D1 which is connected between the output terminal 240 of the voltage converter 500 and the output of the step-down converter of the power module 280 so as to prevent the power module 280 from applying its output voltage directly to the load of the voltage converter 500 during operation in the first mode.

In an alternative embodiment, where the rectifier D1 is connected between the output terminal 240 and the input 285 of the power module 280 that is connected to the input terminal 230, the rectifier D1 serves to prevent the voltage provided at the input terminal 230 from being applied directly to the output terminal 240 of the voltage converter 500 during the first mode of operation, which could damage components that are supplied by the voltage converter 500 as well as the voltage converter 500 itself. In this alternative embodiment, the voltage applied to the output terminal 240 during operation in the second mode is generally higher than $V_{operation}$, and needs to be converted to $V_{operation}$ by the power module's internal step-down converter.

In the embodiment and the alternative embodiment described above, the output terminal 240 may alternatively be connected to the power module 280 by a switch that is controlled to provide the same rectifying behaviour as the diode D1.

Fourth Embodiment

The power supply system of the above-described second embodiment is provided with a power management bus 370 for applying to each of the voltage converters 330-1, 330-2 and 350-1 to 350-3, via the respective supply terminal 290, the voltage from which the converter's power module 280 can derive the respective operation voltage during operation in the second mode. The present embodiment dispenses with the need to provide a power management bus 370 that connects the auxiliary voltage converter 340 to the supply terminal 290 of each voltage converter, and instead makes use of the existing intermediate voltage bus in the system to supply the converters' power modules with power required to configure their controllers.

In addition, the power supply system of the present embodiment provides many of the advantages of the second embodiment whilst employing one or more first converters (e.g. IBC(s)) according to the above-described third embodiment and one or more down-stream converters (supplied by the first converters) which may be conventional, e.g. conventional POL converter(s). Thus, the power supply system of the present embodiment allows these advantages to be achieved with minimal modification of a conventional power supply system of the kind described above with reference to FIG. 1.

Figure 7:
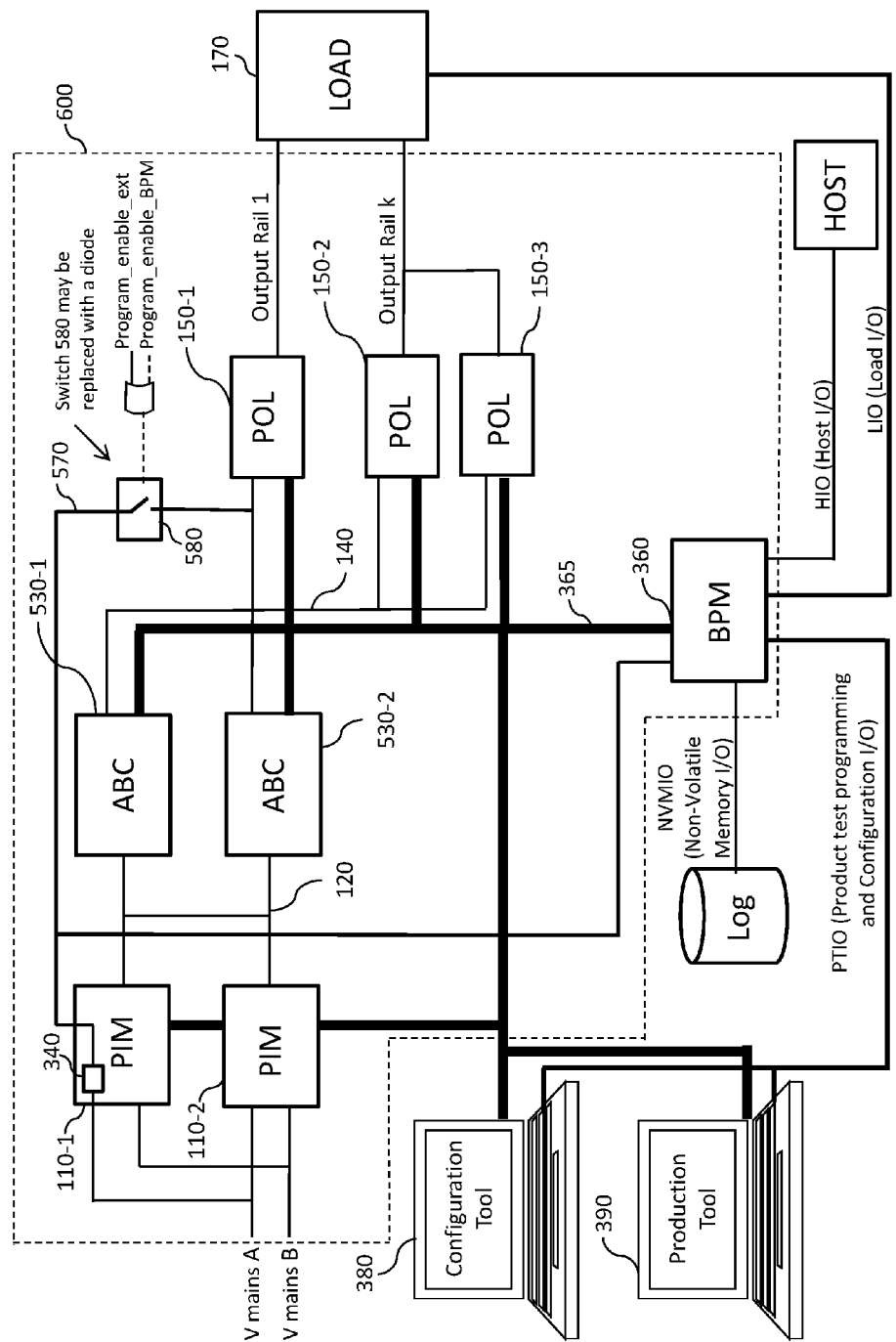
FIG. 7 is a schematic of a power supply system according to a fourth embodiment of the invention, which comprises voltage converters of the third embodiment.

FIG. 7 is a schematic of a power supply system according to the fourth embodiment of the invention. The system of the fourth embodiment has some components in common with the second embodiment illustrated in FIG. 3, and the description of these common components (labelled with like numerals in FIGS. 3 and 7) will not be repeated here. However, the differences between the fourth embodiment and the second embodiment will now be explained.

In place of the voltage converters 330-1 and 330-2 that are provided in the second embodiment, the power supply system 600 of the fourth embodiment comprises voltage converters in the form of IBCs 530-1 and 530-2, each in accordance with the third embodiment. Furthermore, in place of the POL regulators 350-1 to 350-3 that are provided in the second embodiment, the power supply system 600 of the present embodiment comprises voltage converters in the form of conventional POL regulators 150-1 and 150-2, as have been described above with reference to FIG. 1.

In the present embodiment, the auxiliary voltage converter 340 is arranged to supply the management voltage to the IVB 140 via a switch 580, which is controlled by the BPM 360. The switch 580 may alternatively be controlled by an external controller, for example the configuration tool 380 or the production tool 390 describe above. By this arrangement shown in FIG. 7, the auxiliary voltage converter 340 can supply the management voltage to the IBCs 530-1 and 530-2 as well as to the POL regulators 150-1 to 150-3 via the IVB 140 that already connects these voltage converters, such that no additional wiring needs to be provided in order to allow these converters to be configured conveniently and safely. As in the second embodiment, the voltage source 340 may provide a management voltage that is adjustable by the user, so that the voltage drop over the switch 580 and the internal diodes D1 of the IBCs 530-1 and 530-2 can be compensated for.

In the present embodiment, the BPM 360 is arranged to configure the voltage converters 530-1, 530-2 and 150-1 to 150-3 by performing operations that will now be explained with reference to FIG. 8.

Figure 8:
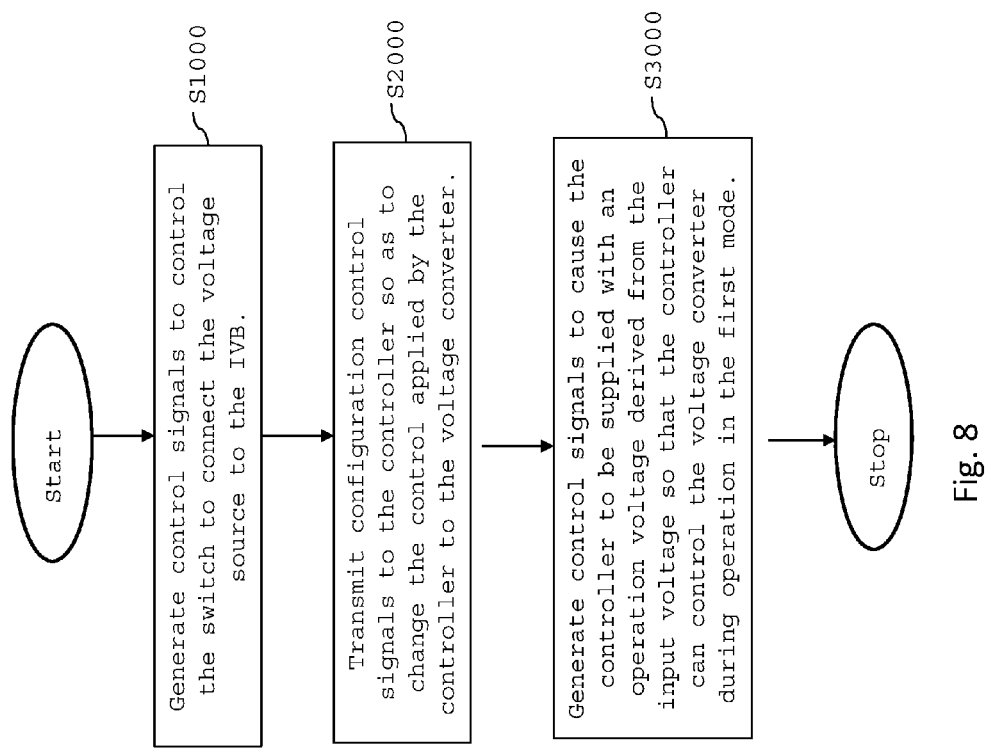
FIG. 8 is a flow diagram illustrating operations performed by the BPM of FIG. 7 to configure the voltage converters in the power supply system of FIG. 7.

In step S1000 of FIG. 8, the BPM 360 generates control signals that cause the switch 580 to close and thereby connect the auxiliary voltage converter 340 to the intermediate voltage bus 140 via the management power bus 370 such that the power module 280 of each of the IBCs 530-1 and 530-2 and the power module of each of the POL regulators 150-1 to 150-3 can derive the operation voltage from the intermediate voltage bus 140 to power the controller 210 of the respective voltage converter. At this stage, the power module 280 of each of the IBCs 530-1 and 530-2 can derive the operation voltage for its IBC from the management voltage that is supplied to it via the management power bus 370, switch 580 and the output terminal 240 of the IBC (please refer to FIG. 6). Meanwhile, each POL regulator derives the necessary operation voltage from its input terminal, in the conventional way.

Referring again to FIG. 8, in step S2000, the BPM 360 generates and transmits configuration control signals to the controller 210 of each of the IBCs 530-1 and 530-2 and POL regulators 150-1 to 150-3 so as to change one or more aspects of the control applied by the controller to its voltage converters, as explained above. Although the BPM 360 thus configures all of these IBCs and POL regulators in the present embodiment, the BPM 360 may alternatively configure at least one IBC and/or at least one POL regulator, as required by the user.

Then, in step S3000, the BPM 560 generates and transmits control signals to control the switch 580 to disconnect the auxiliary voltage converter 340 from the intermediate voltage bus 140. With the IVB 140 disconnected from the auxiliary voltage converter 340, the power supply system can operate in the normal way to progressively convert, from one converter stage to the next, the input mains voltage to the level(s) required by the load 170. During this operation (wherein the converters operate in the aforementioned first mode), the controller of each of the IBCs 530-1 and 530-2 is supplied with an operation voltage derived from the input voltage at the input terminal 230 of the IBC, and the controller of each of the POL regulators 150-1 to 150-3 is supplied with an operation voltage derived from the input voltage at the input terminal 230 of the POL regulator.

MODIFICATIONS AND VARIATIONS

Many modifications and variations can be made to the embodiments described above.

For example, although the voltage converters described in embodiments are digitally managed, it will be appreciated that the present invention is not limited to voltage converters of this kind, and the present invention may also be used to improve the configuration of voltage converters managed by analog signals.

Furthermore, the number of converters in each voltage conversion stage of the power supply systems described above is given by way of example only, and a larger or smaller number of converters may alternatively be provided. For example, the power supply system shown in FIG. 3 or FIG. 7 may be modified to have a single IBC or more than two IBCs, and to have one, two, or more than three POL regulators. Similarly, the number of PIMs in the system is not limited to two so that the system may have a single PIM or no PIMs, depending on the nature of the primary power source feeding the power supply system.

The fourth embodiment described above exploits existing power connections in the power supply system (specifically, the intermediate voltage bus 140) to supply power for configuring the converters during a configuration phase, when the converters operate in the second mode. However, it may be possible to make use of other connections between the converters that may be present in the power supply system. For example, in a modification of the above embodiments, the voltage source (e.g. auxiliary voltage converter 340) may be arranged to supply the management voltage the controller 210 of a voltage converter in the system via the communication link 365, for example via the BPM 360. Thus, the power system controller (for example, the BPM 360) may be arranged to provide one or more of the configurable voltage converters with both the configuration control signals and the power required by the voltage converter(s) to be configured by the control signals during the second mode of operation, via the existing communication link 365.

In a variation of the fourth embodiment of the present invention, a diode may be arranged to connect the voltage source 340 to the intermediate voltage bus 140, instead of the switch 580.

Furthermore, it will be appreciated that, although the power supply systems of the above embodiments each comprise a single IVB 140, multiple IVBs may alternatively be provided in the power supply system of an embodiment to connect the outputs of multiple DC/DC converters to the plurality of POL regulators. Where more than one IVB 140 is present in the power supply system, a corresponding number of switches 580 may be provided, each to connect the voltage source 340 to the respective IVB 140.

The invention claimed is:

1. A power supply system comprising:
a first voltage converter arranged to output an output voltage thereof to an intermediate voltage bus comprising:
a controller operable in
a first mode to control the first voltage converter so as to convert an input voltage at an input of the first voltage converter to the output voltage at an output of the first voltage converter, and
a second mode in which the controller is configurable by configuration control signals so as to change the control applied by the controller to the first voltage converter; and
a power module arranged to derive and supply an operation voltage to the controller, the power module being arranged to derive the operation voltage from:
the input voltage during operation of the controller in the first mode, and a voltage
source other than the input voltage during operation of the controller in the second mode; and
a power system controller configured to generate the configuration control signals and transmit the configuration control signals to the first voltage converter via a communication link;
a second voltage converter connected to the intermediate voltage bus and arranged to convert a voltage on the intermediate voltage bus, which is the output voltage of the first voltage converter, to a second output voltage; and
a diode arranged to connect the voltage source to the intermediate voltage bus.

2. A power supply system comprising:
a first voltage converter arranged to output an output voltage thereof to an intermediate voltage bus comprising:
a first controller operable in
a first mode to control the first voltage converter so as to convert an input voltage at an input of the first voltage converter to the output voltage at an output of the first voltage converter, and
a second mode, in which the controller is configurable by configuration control signals so as to change the control applied by the controller to the first voltage converter; and
a power module arranged to derive and supply an operation voltage to the controller, the power module being arranged to derive the operation voltage from:
the input voltage during operation of the controller in the first mode, and a voltage
source other than the input voltage during operation of the controller in the second mode; and
a power system controller configured to generate the configuration control signals and transmit the configuration control signals to the first voltage converter via a communication link;
a second voltage converter connected to the intermediate voltage bus and arranged to convert the voltage on the intermediate voltage bus to a second output voltage; and
a switch operable to connect the voltage source to the intermediate voltage bus.

3. The power supply system of claim 2, wherein the power system controller is further configured to control the switch so as to connect the voltage source to the intermediate voltage bus during operation of the first voltage converter in the second mode.

4. A method of controlling a power supply system comprising: a first voltage converter comprising:
a controller operable in
a first mode to control the first voltage converter so as to convert an input voltage of the first voltage converter to an output voltage and output the output voltage to an intermediate voltage bus, and
a second mode, in which the controller is configurable by configuration control signals so as to change the control applied by the controller to the first voltage converter; and
a power module arranged to derive and supply an operation voltage to the controller, the power module being arranged to derive the operation voltage from
the input voltage during operation of the controller in the first mode, and a voltage on the intermediate voltage bus during operation of the
controller in the second mode;
a second voltage converter connected to the intermediate voltage bus and arranged to convert the voltage on the intermediate voltage bus to a second output voltage; and
a switch connected to the intermediate voltage bus and operable to apply a voltage to the intermediate voltage bus that is derived from a voltage source other than the input voltage of the first voltage converter,
the method comprising:
configuring, by a power system controller, the controller of the first voltage converter by:
controlling the switch to connect the voltage source to the intermediate voltage bus such that the power module derives the operation voltage from the intermediate voltage bus to power the controller of the first voltage converter;
transmitting configuration control signals to the controller so as to change the control applied by the controller to the first voltage converter; and
controlling the switch to disconnect the voltage source from the intermediate voltage bus; and
following configuration of the controller, generating control signals to cause the controller to be supplied with an operation voltage derived from the input voltage of the first voltage converter so that the controller can control the first voltage converter during operation in the first mode.

* * * * *